United States Patent

Snyder et al.

[11] Patent Number: 5,194,214
[45] Date of Patent: Mar. 16, 1993

[54] TUBE PLUG AND METHOD FOR PLUGGING A TUBE

[75] Inventors: David A. Snyder, North Huntingdon; Eric R. Haberman, White Oak; James W. Everett, Hempfield Township, Westmoreland County; John D. Nee, Level Green, all of Pa.

[73] Assignee: Westinghouse Electric Corp., Pittsburgh, Pa.

[21] Appl. No.: 699,406

[22] Filed: May 13, 1991

[51] Int. Cl.$^5$ .............................................. G21C 13/00
[52] U.S. Cl. ..................................... 376/203; 411/311; 138/89
[58] Field of Search ........................ 376/203, 204, 260; 411/309, 310, 311; 138/89, 96 R, 96 T; 165/71

[56] References Cited

U.S. PATENT DOCUMENTS

| | | |
|---|---|---|
| 2,201,401 | 5/1937 | Jones . |
| 3,661,194 | 5/1972 | Macfarlane et al. ............... 411/311 |
| 3,907,017 | 9/1975 | Stanwick ............................ 411/311 |
| 4,105,058 | 8/1978 | Bunn et al. . |
| 4,212,224 | 7/1980 | Bragg, Jr. et al. . |
| 4,390,042 | 6/1983 | Kucherer et al. . |
| 4,513,788 | 4/1985 | Coker et al. . |
| 4,576,778 | 3/1986 | Ferree et al. . |
| 4,676,530 | 6/1987 | Nordgren et al. . |
| 4,693,389 | 9/1987 | Kalen . |
| 4,697,968 | 10/1987 | Veronesi . |
| 4,711,760 | 12/1987 | Blaushild . |
| 4,712,586 | 12/1987 | McCauley et al. . |
| 4,751,944 | 6/1988 | Sinha et al. . |
| 4,765,374 | 8/1988 | Ermold et al. . |
| 4,771,810 | 9/1988 | Ermold et al. . |
| 4,772,448 | 9/1988 | Popalis et al. . |
| 4,823,846 | 4/1989 | Everett . |
| 4,902,043 | 2/1990 | Zillig et al. . |
| 4,906,153 | 3/1990 | Duran . |
| 4,915,136 | 4/1990 | Bartholomew . |
| 4,982,763 | 1/1991 | Klahn . |
| 4,983,084 | 1/1991 | Gray .................................... 411/311 |
| 5,044,853 | 9/1991 | Dicke ................................... 411/311 |

FOREIGN PATENT DOCUMENTS

1134559 8/1962 Fed. Rep. of Germany .

Primary Examiner—Daniel D. Wasil
Attorney, Agent, or Firm—Aileen C. Addessi

[57] ABSTRACT

A plugging device, such as a tube plug, and method for plugging a tubular member, such as a nuclear steam generator tube, comprises a locking cup for securing together the plurality of members comprising the tube plug. The plugging device may comprise a first member, such as a shell of a tube plug, a second member, such as bolt means of a tube plug and an annular locking cup disposed in a bore of the first member and having outside diameter threads. The outside diameter threads of the locking cup have a deformed portion with a wave-like pattern for providing resistance during threading and unthreading of the locking cup into and out of the first member. At least one of the second member and the locking cup has at least one recess for receiving a deformable portion of the other of the second member and the locking cup for securing the first member, the second member, and the locking cup together. The metal-to-metal abutment of an outside diameter surface of the locking cup and a plug face of the shell and the metal-to-metal abutment of a taper of the bolt means and a taper of the locking cup may seal a chamber within the shell to prevent fluid flow through the tube plug.

19 Claims, 5 Drawing Sheets

TUBE PLUG AND METHOD FOR PLUGGING A TUBE

BACKGROUND OF THE INVENTION

1. Field of the Invention

This invention relates to an apparatus and method for plugging tubular members and, more particularly, to a tube plug and method for plugging a tube, such as a nuclear steam generator heat exchanger tube.

2. Description of the Prior Art

In tube-type heat exchangers, a first fluid flows through the tubes of the heat exchanger while a second fluid surrounds the outside of the tubes such that heat exchange occurs between the two fluids. Occasionally, one of the tubes can become defective such that a leak either is impending or occurs therein which allows the two fluids to mingle. When this occurs, it is sometimes necessary to plug the tube so that the fluid does not flow through the tube thereby preventing leakage from the tube.

The tube-type heat exchangers utilized in nuclear reactor power plants are commonly referred to as steam generators. When a defect occurs in the tubes of a nuclear steam generator that allows the primary fluid in the tubes to mingle with the secondary fluid outside of the tubes, a more significant problem arises. Not only does this situation create an ineffective heat exchanger, but it also creates a radioactive contamination problem. Since the fluid flowing in the tubes of a nuclear steam generator is radioactive, it is important that it not be allowed to leak from the tubes and contaminate the fluid surrounding the tubes. Therefore, when a leak occurs in a nuclear steam generator heat exchange tube, the heat exchange tube is plugged so that the primary fluid is not permitted to flow through the tube. This prevents contamination of the fluid surrounding the tubes.

There are several kinds of mechanical plugs that can be used to plug heat exchange tubes. One such device used to plug heat exchange tubes in nuclear steam generators is disclosed in U.S. Pat. No. 4,982,763 issued Jan. 8, 1991 to Klahn entitled "Plug Retainer". The plug retainer for retaining a tube plug comprises a locking cup having a bore therethrough and an externally threaded lower portion adapted to be threadably received in the open threaded end of the tube plug and a cap screw having a threaded shank threadably receivable in the threaded mandrel of the tube plug. The locking cup is crimped onto the cap screw by the use of flutes on the cap screw head. However, the locking cup may inadvertently back out of the tube plug due to vibration during the operation of the steam generator.

Another type of mechanical plug is disclosed in co-pending application Ser. No. 07/699416 filed concurrently herewith by Keating entitled "Tube Plug and Method for Plugging a Tube" and assigned to the assignee of the present invention. The tube plug for plugging a tube to prevent fluid flow through the tube comprises a shell, an expander member, bolt means to seal the chamber defined by the shell, and locking means for securing the shell, the bolt means, the expander member, and the locking means together. The locking means comprises a tab portion deformable into at least one recess in the bolt means or the shell.

Another type of mechanical plug is disclosed in co-pending application Ser. No. 07/439,118 filed Nov. 20, 1989 by Haberman et al. and assigned to the assignee of the present invention. The tube plug for plugging a tube to prevent flow through the tube comprises a shell, an expander member, and a sealing member to seal the chamber defined by the shell. The sealing member and shell are welded together for locking or fastening the sealing member to the shell to prevent the sealing member and shell from separating. The installation of the sealing member into the shell seals the open end of the shell to prevent coolant from entering the chamber of the shell and exerting pressure on the plug wall, and occupies space within the chamber of the shell to reduce the possibility of residual stresses within the plug wall. Although the tube plug successfully plugs tubes, welding the sealing member and the shell together requires the additional steps of welding and of inspection of the weld during the installation of the tube plug into the tube. Also, if the shell of the tube plug has been recessed a distance into the tube, the sealing member cannot be welded to the shell, and therefore the sealing member and shell cannot be secured together by welding.

Therefore, what is needed is a tube plug which includes means for securing the plurality of members comprising the tube plug together so that the members of the tube plug will not vibrate apart. Also, what is needed is a method for installing the tube plug.

SUMMARY

A plugging device, such as a tube plug, for preventing the flow of fluid through an opening or a tubular member, such as a nuclear steam generator tube, comprises a locking cup for securing together the plurality of members comprising the tube plug. The plugging device comprises a first member, such as a shell of a tube plug, having a bore at least partially therethrough with a portion with inside diameter threads, a second member, such as bolt means of a tube plug, disposed in the bore of the first member, and an annular locking cup disposed in the bore of the first member and having outside diameter threads. The outside diameter threads have a deformed portion for providing significant added resistance to the threading and unthreading of the locking cup into and out of the first member for preventing the inadvertent separation of the first member, the second member, and the locking cup. The deformed portion may have a wave-like pattern formed by at least one offset of the root and of the pitch and formed by at least one protuberance of the outside diameter threads of the locking cup. At least one of the second member and the locking cup has at least one recess for receiving a deformable portion of the other of the second member and the locking cup for securing the first member, the second member, and the locking cup together.

The tube plug may also comprise an expander member for threadedly engaging with the bolt means, where the threads of the expander member and bolt means may have a different pitch size than the threads of the locking cup and the shell, thereby providing an additional fastening feature of the tube plug. The metal-to-metal abutment of an outside diameter surface of the locking cup and a plug face of the shell and the metal-to-metal abutment of a taper of the bolt means and a taper of the locking cup seals a chamber within the shell to prevent fluid flow through the tube plug.

A method for plugging a tube comprises the steps of installing the shell within a tube, deforming the threads of a locking cup into a wave-like configuration, threading the locking cup into the shell, disposing a bolt means in the locking cup and the shell, and crimping the locking cup into a recess of the bolt means for securing together the shell, the bolt means, and the locking cup to prevent fluid flow through the tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides a plugging device, such as a tube plug, and a method for plugging a tubular member, such as a nuclear steam generator tube, which utilizes a locking cup for securing together the individual components comprising the tube plug, thereby reducing the possibility of a separation of the plurality of members of the tube plug due to vibration during the operation of the steam generator.

Figure 1:
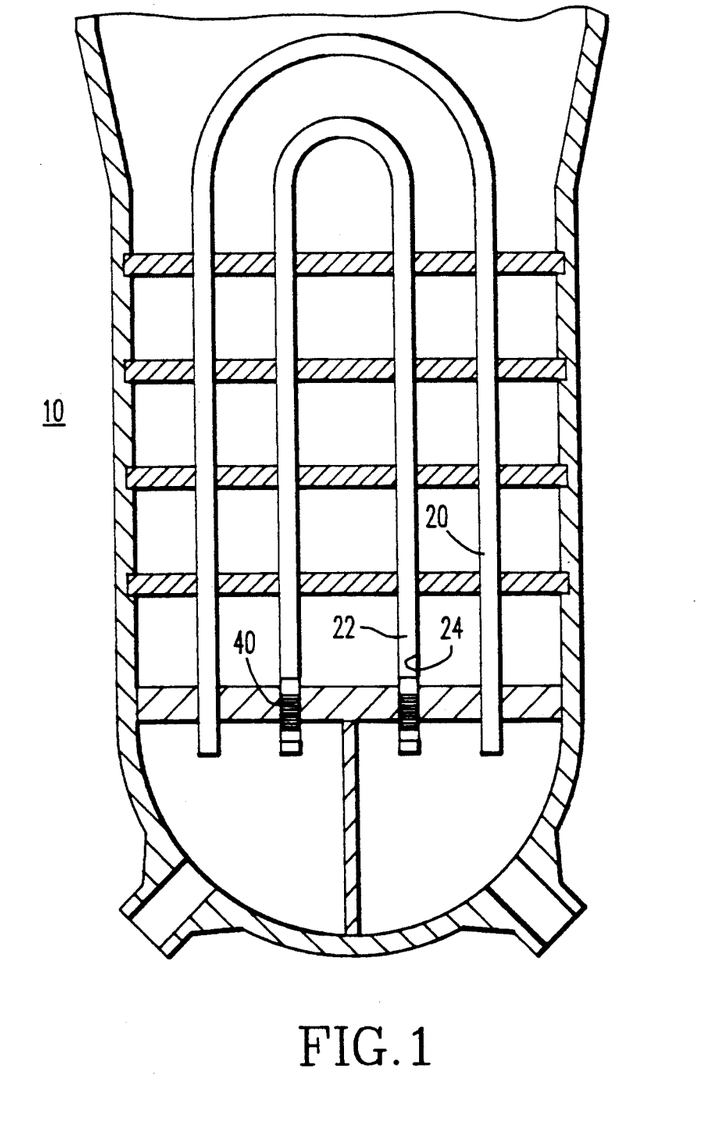
FIG. 1 is a schematic illustration of a steam generator in partial vertical section with parts removed for clarity and also shows two steam generator tubes, one of the tubes having tube plugs disposed in the open ends of the tube.

Referring to FIG. 1, the steam generator 10 is schematically shown having a plurality of tubes 20 (only two of which are shown) disposed therein. One of the tubes 20, for example a tube 22 having an inner wall 24, may have become degraded due to vibration or primary water stress corrosion cracking, which may have occurred during operation of the steam generator 10. The tube 22 may have a crack which will allow the commingling of the radioactive primary fluid in the tube 22 with the nonradioactive secondary fluid outside the tube 22. To prevent any such fluid commingling, the steam generator 10 is taken out of service in a manner well known in the art and a tube plug 40 is disposed in both open ends of the tube 22 for plugging the degraded tube 22. After the tube 22 is plugged, the steam generator 10 is returned to service. The tube plug 40 prevents the flow of primary fluid through the tube 22. However, the stress corrosion cracking which caused the tube 22 to degrade may also affect the tube plug 40 and thus cause the tube plug 40 to likewise degrade.

Figures 2, 3:
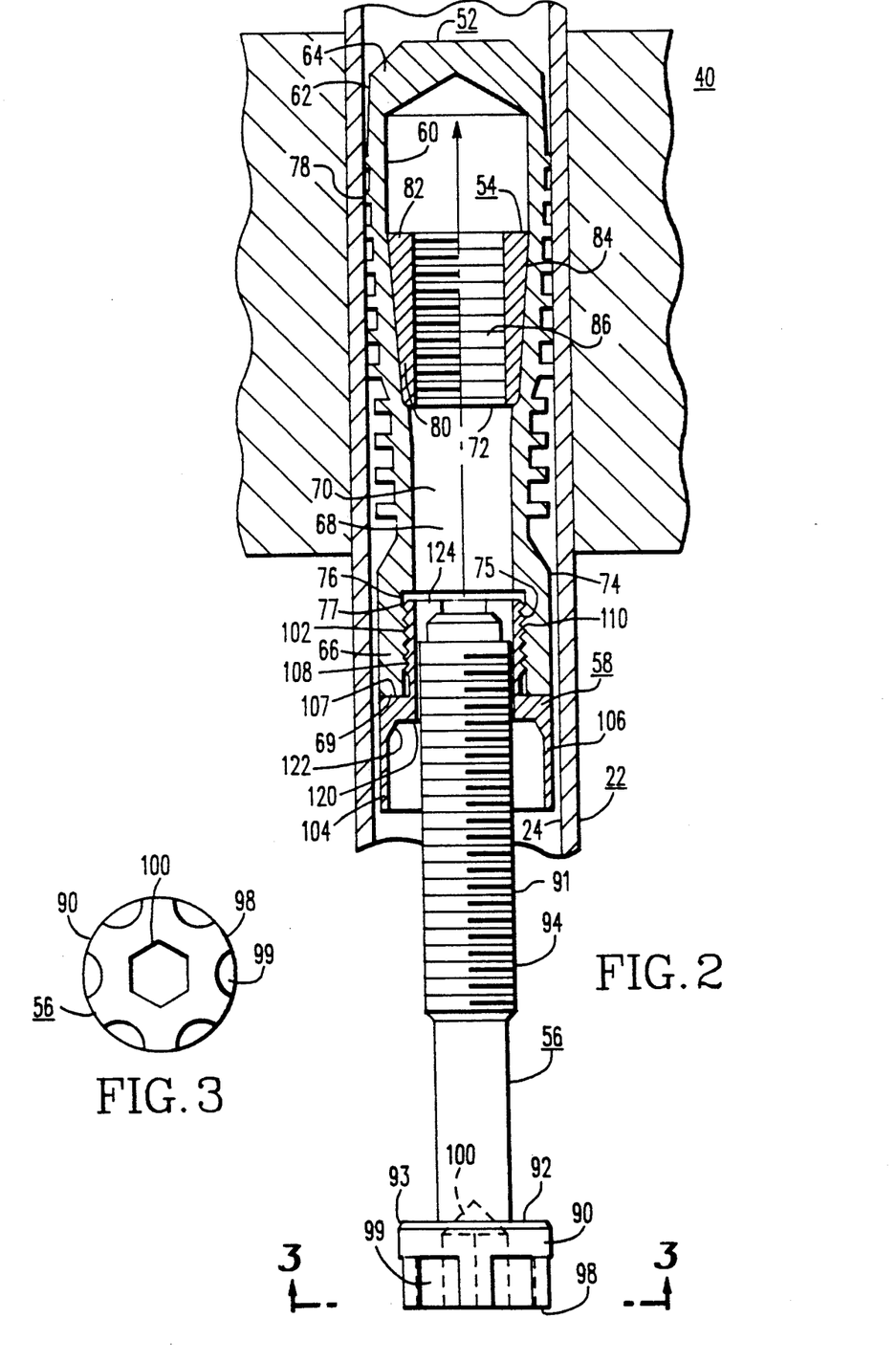
FIG. 2 is an exploded view and partial vertical section of a tube plug.
FIG. 3 is a view along line III—III of FIG. 2.

Referring to FIG. 2, the tube plug 40 comprises a first member, such as a shell 52, an expander member 54, a second member, such as bolt means 56, and a locking cup 58. The shell 52 is a substantially cylindrical member manufactured from a metal, such as Inconel 600. The metal Inconel is an alloy composed substantially of nickel, chromium, and iron and a trace amount of cobalt. The shell 52 has a conical inner surface 60 of an outer wall 62, which has a larger diameter at a closed end 64 of the shell 52 and a smaller diameter at an open end 66 of the shell 52. The shell 52 also has a bore 68 at least partially therethrough and a plug face 69 at the open end 66. The closed end 64, open end 66 and outer wall 62 define a chamber 70 in the shell 52. Disposed in the chamber 70 is the expander member 54, which may have a threaded cylindrical bore 72 therethrough, for expanding the outer wall 62 of the shell 52 into sealing engagement with the inner wall 24 of the tube 22 for plugging the tube 22. The inner surface 60 is formed such that the expander member 54 is captured within the shell 52 so that movement of the expander member 54 relative to the inner surface 60 causes the shell 52 to expand without allowing the expander member 54 to be removed from the shell 52.

The shell 52 has a threaded cylindrical skirt portion 74 near the open end 66, which has a diameter larger than the smallest diameter of the inner surface 60 of the outer wall 62 for allowing an apparatus (not shown), such as a tool for manipulating the expander member 54, to be threadedly engaged in the skirt portion or to be inserted through the threaded skirt portion 74 and into the chamber 70. The skirt portion 74 has inside diameter threads 75 for threadedly engaging the locking cup 58. The skirt portion 74 also has a recess 76 positioned adjacent to and inward of the inward end 77 of the inside diameter threads 75 of the skirt portion 74 for providing thread relief to the inside diameter threads 75.

The shell 52 also has a substantially uniform wall thickness in the portion of the shell 52 that is expanded by the expander member 54. A plurality of outer lands 78 may be integrally formed on the outer wall 62 of the shell 52 in a manner such that the height of each land 78 increases from the closed end 64 to open end 66 while the outer surfaces of all the lands 78 are maintained at approximately the same external diameter and while the wall thickness of the shell 52 remains substantially constant throughout the portion of the shell 52 where the lands 78 are located. The lands 78 provide an enhanced seal between the shell 52 and the tube 22. The shell 52 is also constructed such that the skirt portion 74 near the open end 66 has a thicker wall section than the remainder of the shell 52 to provide stability in extracting the tube plug 40.

Prior to the completion of manufacture of the shell 62, the expander member 54 is installed through the open end 66 of the shell 52 and into the chamber 70 of the shell 52. Then, the shell 52 is swaged so that the expander member 54 is captured within the shell 52.

Still referring to FIG. 2, the expander member 54 may be manufactured from a hardenable metal, such as a Carpenter Custom 455 and is formed, in this embodiment, such that it has a leading end 80, which has a tangentially blended radius that minimizes "plowing" or pushing metal ahead of the expander member 54 when the expander member 54 is pulled through the shell 52. The expander member 54 also has a polished exterior surface that enhances its movement relative to the shell 52. The expander member 54 also has a trailing edge 82, which is formed to have a sharp edge such that it provides a self-locking mechanism. While the sharp edge feature of the trailing edge 82 retains the expander member 54 from moving toward the closed end 64 of the shell 52, thereby preventing inadvertent diametral contraction of the shell 52, the construction of the expander member 52 is such that the sharp edge feature of the trailing edge 82 does not prevent the expander member 52 from being pushed toward the closed end 64 by a plug removal tool (not shown).

The expander member 54 is also provided with a conical outer surface 84 that is arranged such that its outside diameter is smaller near the leading end 80 and larger near the trailing edge 82. The shape of the outer surface 84 provides a mechanism for expanding the shell 52 when the expander member 54 is moved relative to the shell 52. The expander member 54 also has inside diameter threads 86, which may be used for gripping a plug installation tool (not shown) during the expansion process and can be used to engage the bolt means 56. As described hereinabove, the shell 52 and the expander member 54 may be of the type disclosed in U.S. Pat. No. 4,390,042 issued Jun. 28, 1983 to Kucherer et al. entitled "Tube Plug" and assigned to the assignee of the present invention.

Still referring to FIGS. 2 and 3, the bolt means 56 has a bolt head 90 at one end, a shaft 91 at an opposite end, and a surface 92 and a taper 93 positioned between the bolt head 90 and the shaft 91. When disposed through the open end 66 of the shell 52, the bolt head 90 is defined as that end portion of bolt means 56 nearer open end 66 of the shell 52 and the shaft 91 is defined as that end portion of bolt means 56 nearer closed end 64 of the shell 52. The shaft 91 may have outside diameter threads 94 corresponding to inside diameter threads 86 of the expander member 54 for threaded engagement of the bolt means 56 and the expander member 54. Bolt means 56 may be manufactured from a metal, such as Inconel 690, for resisting stress corrosion cracking.

The bolt head 90 has a scalloped portion 98 with at least one recess 99, but preferably at least two recesses for providing a stronger locking feature for the tube plug 40, for engaging the locking cup 58 to secure together the shell 52, the expander member 54, the bolt means 56, and the locking cup 58. The bolt head 90 of bolt means 56 also has a cavity 100, such as a hexagonal hole, for receiving an apparatus (not shown) capable of inserting the bolt means 56 into and retrieving bolt means 56 from the shell 52 and the expander member 54. The bolt head 90 of the bolt means 56 is sized to be received within the locking cup 58 and has a larger diameter than the shaft 91 of the bolt means 56 for providing the surface 92 and taper 93 therebetween. Because the exact position of the expander member 54 within the shell 52 may not be known, the length of the bolt means 56 should be sufficient for the outside diameter threads 94 of bolt means 56 to engage with the inside diameter threads 86 of any installed expander member 54.

By installing the bolt means 56 into the shell 52, fluid is prevented from corrosively attacking the inner surface 60 of the shell 52. Also, the bolt means 56 occupies space within the chamber 70, thereby reducing the liquid volume within the chamber 70 so that any stored energy in the chamber 70 is minimized. Sealing the chamber 70 and reducing the liquid volume within the chamber 70 provides a tube plug 40 having reduced susceptibility to stress corrosion cracking. Also, by threading the bolt means 56 into the expander member 54, the expander member 54 is retained by the bolt means 56 in the unlikely event of a portion of the shell 52 cracking, thereby preventing the expander member 54 from moving loosely throughout the steam generator.

Figure 4:
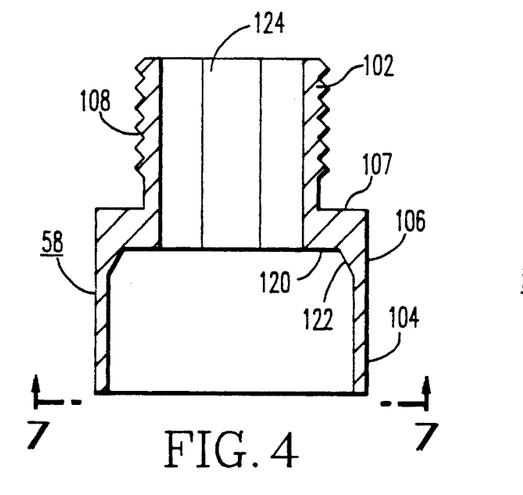
FIG. 4 is a partial vertical section of a locking cup.

Referring to FIGS. 2 and 4, tube plug 40 also comprises locking cup 58, which may be manufactured from Inconel 690 for reducing the susceptibility of the locking cup 58 to stress corrosion cracking. Locking cup 58 is an annular member having an inward open end portion 102, an outward open end portion 104, a wall 106, and an outside diameter surface 107 positioned between the outward open end portion 104 and the inward open end portion 102. The inward open end portion 102 has a smaller diameter than the diameter of the outward open end portion 104 for enabling the inward open end portion 102 to be installed within the skirt portion 74 of the shell 52 and the outside diameter surface 107 to abut shell 52. The diameter of the outward open end portion 104 is of a size to enable the locking cup 58 to be installed within tube 22, thereby enabling the locking cup 58 to be installed in a tube plug 40 positioned at any elevation within the tube 22. When the locking cup 58 is installed within the shell 52, the outside diameter surface 107 of the locking cup 58 abuts the plug face 69 of the shell 52 for sealing the chamber 70 of the shell 52. Wall 106 has outside diameter threads 108 at the inward open end portion 102 corresponding to the inside diameter threads 86 of the skirt portion 74 of the shell 52 for threaded engagement of the locking cup 58 and the shell 52.

Figure 5:
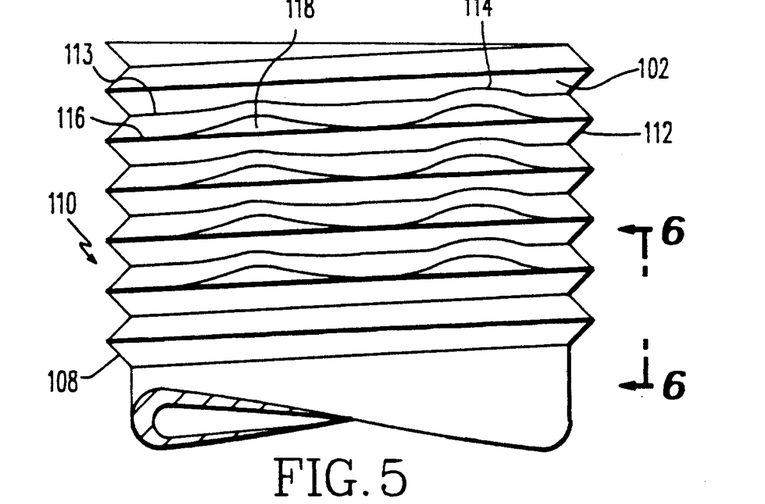
FIG. 5 is an isometric view of a deformed portion of the outside diameter threads of the locking cup.

Referring to FIG. 5, the outside diameter threads 108 have a deformed portion 110 for resisting the threading and unthreading of the locking cup 58 into and out of the shell 52 for preventing the inadvertent separation of the shell 52, the bolt means 56, and the locking cup 58. The deformed portion 110 includes at least two segments of the outside diameter threads 108 and has outside diameter threads 112 with a deformed thread shape. A segment is the distance from a point on the outside diameter threads 108 to the corresponding point on the outside diameter threads 108 after one complete turn of the locking cup 58. The deformed portion 110 may comprise 4-5 segments maximum.

Still referring to FIG. 5, the pitch of the outside diameter threads 112 of the deformed portion 110 is offset from the pitch of the outside diameter threads 108 of the locking cup 58 for providing the additional resistance to the unthreading of the locking cup 58 from the shell 52. As an example, the degree of the offset between the pitch of the outside diameter threads 112 and the pitch of the outside diameter threads 108 may be approximately 0.005 inches for obtaining the desired degree of interference between the inside diameter threads 75 of the shell 52 and the outside diameter threads 112 of the locking cup 58.

Figure 6:
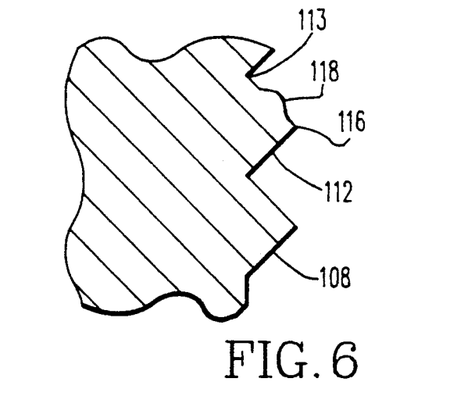
FIG. 6 is an enlarged detailed view along line VI—VI of FIG. 5.

Referring to FIGS. 5 and 6 and using the same reference characters to define like parts, FIG. 6 is a detailed enlarged view of the threads illustrated in FIG. 5. At least one portion of the root 113 of the outside diameter threads 112 is offset from the configuration of the root 113 of the outside diameter threads 108 so that the root 113 of the deformed portion 110 includes at least one wave 114. Within a segment, a root 113 with a plurality of offsets has the configuration of a wave-like pattern. As an example, the root 113 of the deformed portion 110 may be offset 0.005 inches from the position of the remainder of the root of the outside diameter threads 108 and 112.

Referring again to FIGS. 5 and 6, positioned between the crest 116 and the root 113 is at least one protuberance 118. The protuberance 118 is axially aligned with each wave 114. Preferably, for each segment, the outside diameter threads 112 may have two protuberances 118 and the root 113 may have two waves 114. As an example, the protuberance 118 may have a width of approximately 0.005 inches, a height of approximately 0.005 inches, and a length of approximately 0.200 inches for obtaining the desired degree of resistance between the inside diameter threads 75 of the shell 52 and the outside diameter threads 112 of the locking cup 58, during the installation of the locking cup 58 into and the removal of the locking cup 58 from the shell 52.

Referring to FIG. 5, an installation tool (not shown) and a removal tool (not shown) provides a torque sufficient to overcome the interference between the deformed portion 110 of the locking cup 58 and the inside diameter threads 75 of the shell 52, such as a torque of approximately 35–50 in-lb. The torque required to install a locking cup not having a deformed portion 110 is approximately 10 in-lb. Requiring the additional torque of approximately 25–40 in-lb, the locking cup 58 with the deformed portion 110 provides a locking cup with an additional resistance to the threading or unthreading of the locking cup 58 into or out of the shell 52. During the installation of the locking cup 58 into the shell 52, the inside diameter threads 75 of the shell 52 will be plastically deformed. During the removal of the locking cup 58 from the shell 52, the inside diameter threads 75 of the shell 52 will be plastically deformed, which will provide an additional resistance to the inadvertent unthreading of the locking cup 58 from the shell 52. Preferably, the outside diameter threads 108 and the outside diameter threads 1 12 of the threaded portion 110 of the locking cup 58 may be formed by the process of thread rolling for preventing high stress concentration at the root of the threads. The protuberance 118 may be formed by displacing a portion of the thread form between the crest 116 and the root 113. In addition to the wave-like pattern of the root 113 and the protuberances 118 of the deformed portion 110 providing additional resistance during the unthreading of the locking cup 58 from the shell 52, the deformed portion 110 also provides resistance to the inadvertent loosening of the locking cup 58 from the shell 52 due to vibrations occurring during the operation of the steam generator, thereby preventing loose parts from moving throughout the steam generator.

Figure 7:
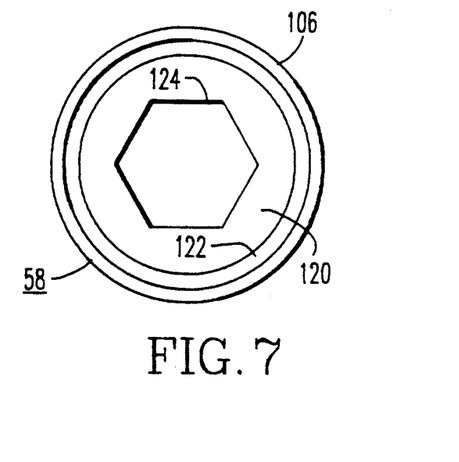
FIG. 7 is a view along line VII—VII of FIG. 4.
Figure 8:
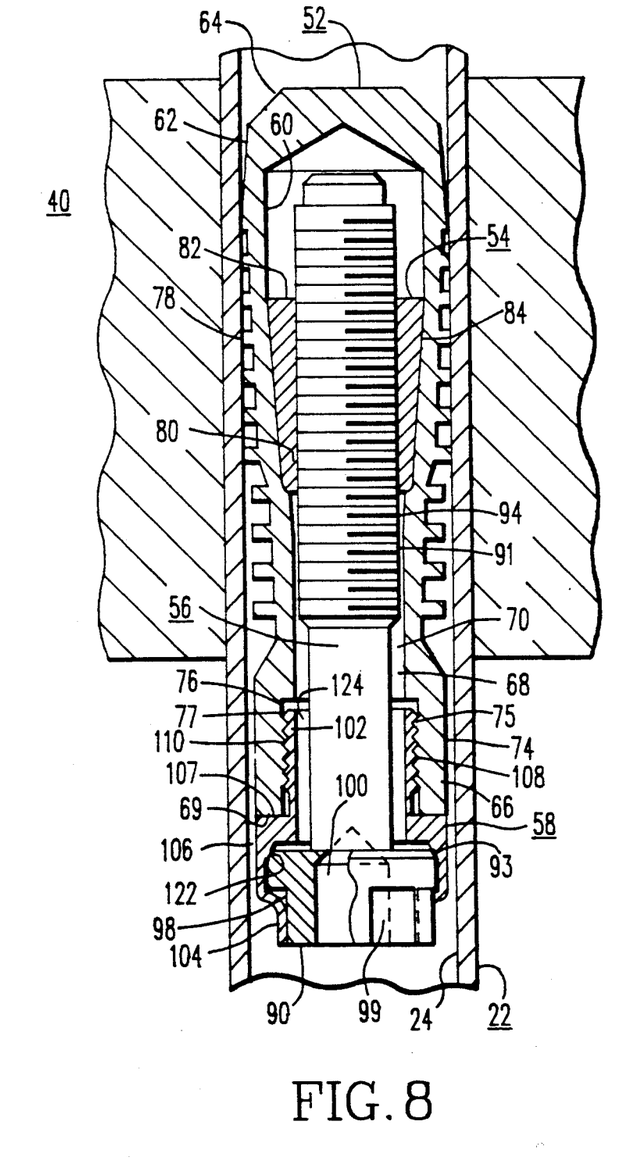
FIG. 8 is a partial vertical section of the tube plug having bolt means and the locking cup installed within a shell of the tube plug.

Referring to FIGS. 2, 7 and 8, the inside diameter threads 75 of the shell 52 and the outside diameter threads 108 of the locking cup 58 have a larger pitch than the inside diameter threads 86 of the expander member 54 and the outside diameter threads 94 of the bolt means 56 for providing an additional locking means for securing together the bolt means 56, the locking cup 58, the expander member 54, and the shell 52. The locking cup 58 further comprises an inside diameter surface 120 positioned between the outward open end portion 104 and the inward open end portion 102 and positioned substantially parallel to the outside diameter surface 107. A taper 122 is positioned between the inside diameter surface 120 and the outward open end portion 104 at the inside diameter of wall 106 of the locking cup 58. The angle of the taper 122 corresponds to the angle of the taper 93 of bolt means 56 for providing an interference fit between the taper 122 and the taper 93 to seal the chamber 70 of the shell 52. The locking cup 58 also prevents inadvertent backward movement of the bolt means 56 relative to the shell 52. Referring to FIG. 7, the bore through the inward open end portion 102 of locking cup 58 may be a hexagonal bore 124 for receiving an apparatus (not shown) capable of inserting the locking cup 58 into and retrieving the locking cup 58 from the shell 52.

Referring again to FIGS. 2, 7 and 8, the threads 108 and 112 may be sized and shaped for known forces such that the torque required for removal of the bolt means 56 and the locking cup 58 is higher than the torque expected to be applied to the bolt means 56 during service of the steam generator. By planning the size and shape of the threads 108 and 112, if the tube plug 40 needs to be removed from the tube 22, the tube plug 40 may be efficiently removed from the tube 22.

Figure 9:
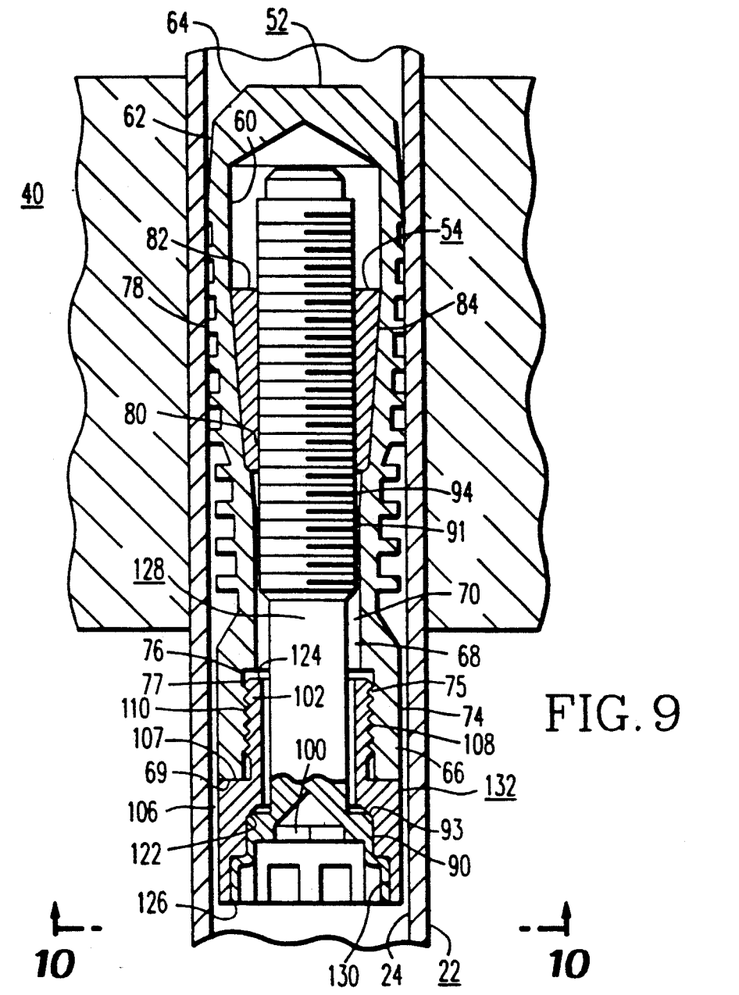
FIG. 9 is a partial vertical section of an alternative embodiment of the tube plug.
Figure 10:
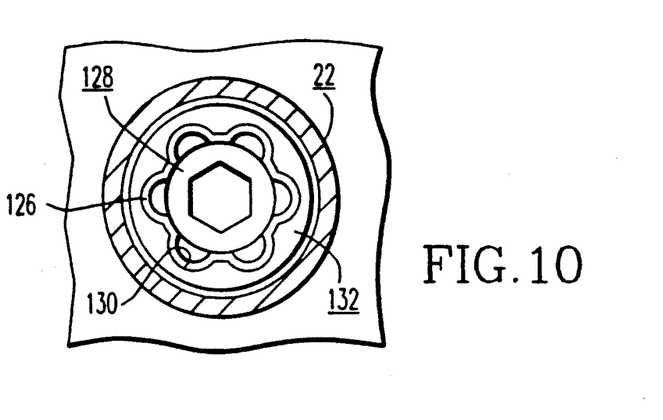
FIG. 10 is a view along line X—X of FIG. 9.

The outward open end portion 104 of the locking cup 58 may be deformed or crimped into the recess 99 of the scalloped bolt head 90 of the bolt means 56 for securing the shell 52, the expander member 54, the bolt means 56, and the locking cup 58 together. Referring to FIGS. 9 and 10 and using the same reference characters to define like parts, as an alternative, a deformable portion 126 of a bolt means 128 may be deformed or crimped into a recess 130 of a locking cup 132.

By utilizing locking cup 58 having the deformed portion 110 with the deformed thread shape and the crimpable outward end portion 104, the plurality of members comprising the tube plug 40 can be secured together and the chamber 70 will remain sealed to prevent fluid from entering the chamber 70 and corrosively attacking the inner surface 60 of the shell 52. The locking or fastening feature of the tube plug 40 also prevents a separation of the members, which may result in loose parts moving throughout the steam generator.

OPERATION

Referring again to FIG. 2, the shell 52 and the expander member 54 may be positioned within the tube 22, as described in U.S. Pat. No. 4,390,042 issued Jun. 28, 1983 to Kucherer et al. entitled "Tube Plug", and assigned to the assignee of the present invention. An installation tool (not shown) is inserted into the hexagonal bore 124 of the locking cup 58 to thread the locking cup 58 into the skirt portion 74 of the shell 52. The surface 107 of the locking cup 58 will seat on the plug face 69 of the shell 52. A torque, such as 35 in-lb, is applied during the installation of the locking cup 58 into the shell 52 for overcoming the resistance of the deformed portion 110 of the outside diameter threads 108 as the locking cup 58 is threaded into the skirt portion 74 of the shell 52 and for providing the interference fit between the plug face 69 of the shell 52 and the surface 107 of the locking cup 58 An installation tool (not shown) is inserted into the cavity 100 of the bolt head 90 to install the bolt means 56 in the locking cup 58 and to thread the bolt means 56 into the expander member 54 positioned within the shell 52. The taper 93 of the bolt means 56 will seat on the taper 122 of the locking cup 58. The installation tool (not shown) applies a torque to the bolt means 56, such as 90 in-lb, to provide the interference fit between the taper 122 of the locking cup 58 and taper 93 of the bolt means 56. The torque applied should be sufficient to prevent significant leakage of fluid into the chamber 70 of the shell 52 through the metal-to-metal abutment of the plug face 69 of the sell 52 and the outside diameter surface 107 of the locking cup 58 and through the metal-to-metal abutment of the taper 122 of the locking cup 58 and the taper 93 of the bolt means 56, sufficient to prevent loosening of the tube plug 40 while the tube plug 40 is in service, and sufficient to keep a compressive load on the closed end 66 of the shell 52 for reducing the possibility of a separation of the shell 52 due to stress corrosion cracking.

Referring again to FIG. 8, after the locking cup 58 is installed within the skirt portion 74 of the shell 52 and the bolt means 56 is installed within the locking cup 58, the outward open end portion 104 of the locking cup 58 may be deformed or crimped into the recess 99 of the scalloped portion 98 of the bolt head 90 of the bolt means 56 for securing the shell 52, the expander member 54, the bolt means 56, and the locking cup 58 together. Referring again to FIGS. 9 and 10, as an alternative, a deformable portion 126 of the bolt means 125 may be deformed or crimped into a recess 130 of the locking cup 132 for securing together the individual components of the plug 40.

Referring again to FIG. 8, to remove the tube plug 40 from the tube 22, the bolt means 56 and locking cup 58 must be removed from the shell 52, and then the shell 52 may be removed from the tube 22 by methods well known in the art. To remove the bolt means 56 from the shell 52, a removal tool (not shown) is inserted into the cavity 100 in the bolt head 90 and provides a torque sufficient to deform the crimped locking cup 58 so that the crimped outward open end portion 104 disengages from the recess 99 of the scalloped portion 98 of the bolt head 90. The bolt means 56 is unthreaded from the expander member 54. After the bolt means 56 is removed from the shell 52, a removal tool (not shown) is inserted into the hexagonal bore 124 of the locking cup 58, and then the locking cup 58 is unthreaded from the skirt portion 74 utilizing a torque sufficient to overcome the resistance from the deformed portion 110 of the outside diameter threads 108 of the locking cup 58. If the tube plug 40 is designed so that the locking cup 58 and the bolt means 56 must be removed as one unit, the torque must be sufficient to overcome the resistance from the difference in the pitch sizes of the threads 75 of the skirt portion 74 of the shell 52 and of the threads 86 of the expander member 54.

Therefore, the invention provides a plugging device, such as a tube plug, and a method that utilizes a locking cup to lock or fasten together the plurality of members comprising the tube plug in a manner so that the plurality of members will not vibrate apart, thereby preventing loose parts from moving throughout the steam generator, a locking or fastening means that will lock or fasten the bolt means to the shell at any elevation of the shell within the tube, and a tube plug that has a reduced susceptibility to stress corrosion cracking due to the reduction of primary fluid within the chamber of the tube plug.

We claim:

1. A tube plugging device, comprising:
a first member having a bore at least partially therethrough, said bore having a portion with inside diameter threads;
a second member disposed in said bore of said first member;
an annular locking cup, disposed in said bore of said first member, having an inward open end portion and an outward open end portion, said inward open end portion having outside diameter threads corresponding to said inside diameter threads of said first member for threaded engagement of said locking cup and said first member;
at least one of said second member and said locking cup having at least one recess therein, the other of said second member and said locking cup deformable to engage said recess for securing said first member, said second member, and said locking cup together; and
said outside diameter threads of said locking cup having a deformed portion, said deformed portion including at least two segments of said outside diameter threads having at least one protuberance positioned between a crest and a root of said outside diameter threads and having at least one portion of a root of said deformed portion offset from a root of the remainder of said deformed portion, said offset of said root being axially aligned with said protuberance for resisting the threading of said locking cup into and out of said first member for preventing the inadvertent separation of said first member, said second member, and said locking cup.

2. The plugging device according to claim 1, wherein said deformed portion of said outside diameter threads of said locking cup comprises at least two segments of said outside diameter threads deformed so that a pitch of said outside diameter threads of said deformed portion is offset from a pitch of the remainder of said outside diameter threads of said locking cup for resisting the unthreading of said locking cup from said first member.

3. The plugging device according to claim 1, wherein said second member comprises at least one recess positioned at an end of said second member for engaging said outward open end portion of said locking cup for securing said first member, said second member, and said locking cup together.

4. The plugging device according to claim 1, wherein said plugging device further comprises a third member, disposed in said bore of said first member for expanding said first member into sealing engagement when installed in a tube, and having a bore therethrough with inside diameter threads corresponding to outside diameter threads of said second member for threaded engagement of said second member and said third member.

5. The plugging device according to claim 4, wherein said inside diameter threads of said third member and said outside diameter threads of said second member have a different pitch than a pitch of said inside diameter threads of said first member and said outside diameter threads of said locking cup for providing an additional fastening feature to secure said first member, said second member, said third member, and said locking cup together.

6. The plugging device according to claim 4, wherein said first member is a shell having a closed end, an open end, and an outer wall defining a chamber in said shell for plugging a tube.

7. The plugging device according to claim 6, wherein said second member is bolt means having a shaft and a bolt head, disposed in said open end of said shell, for sealing said chamber defined by said shell.

8. The plugging device according to claim 7, wherein said third member is an expander member having a bore therethrough with inside diameter threads for threaded engagement with said shaft of said bolt means.

9. A tube plug for plugging a tube, comprising:
a shell having a closed end, an open end, and an outer wall defining a chamber in said shell and having inside diameter threads positioned near said open end;

bolt means disposed in said open end of said shell;

an annular locking cup, disposed in said open end of said shell, having an inward open end portion and an outward open end portion, said inward open end portion having outside diameter threads corresponding to said inside diameter threads of said shell for threaded engagement of said locking cup and said shell;

at least one of said bolt means and said locking cup having at least one recess therein, the other of said bolt means and said locking cup deformable to engage said recess for securing said shell, said bolt means, and said locking cup together; and said outside diameter threads of said locking cup having a deformed portion, said deformed portion including at least two segments of said outside diameter threads having at least one protuberance positioned between a crest and a root of said outside diameter threads and having at least one portion of a root of said deformed portion offset from a root of the remainder of said deformed portion, said offset of said root being axially aligned with said protuberance for resisting the threading of said locking cup into and out of said shell for preventing the inadvertent separation of said shell, said bolt means, and said locking cup.

10. The plugging device according to claim 9, wherein said deformed portion of said outside diameter threads of said locking cup comprises at least two segments of said outside diameter threads deformed so that a pitch of said outside diameter threads of said deformed portion is offset from a pitch of the remainder of said outside diameter threads of said locking cup for resisting the unthreading of said locking cup from said shell.

11. The tube plug according to claim 9, wherein said bolt means comprises at least one recess positioned at an end of said bolt means for engaging said outward open end portion of said locking cup for securing said shell, said bolt means, and said locking cup together.

12. The tube plug according to claim 9, wherein said tube plug further comprises an expander member, disposed in said chamber of said shell for expanding said outer wall of said shell into sealing engagement when installed in a tube, and having a bore therethrough with inside diameter threads corresponding to outside diameter threads of said bolt means for threaded engagement of said bolt means and said expander member.

13. The tube plug according to claim 12, wherein said inside diameter threads of said expander member and said outside diameter threads of said bolt means have a different pitch than a pitch of said inside diameter threads of said shell and said outside diameter threads of said locking cup for providing an additional fastening feature to secure said shell, said bolt means, said expander member, and said locking cup together.

14. The tube plug according to claim 9, wherein said locking cup further comprises an outside diameter surface positioned between said inward open end portion of said locking cup and said outward open end portion of said locking cup for sealingly abutting a plug face of said shell positioned at said open end of said shell, for sealing said chamber of said shell to prevent fluid flow through said tube plug.

15. The tube plug according to claim 9, wherein said bolt means further comprises an outside diameter taper positioned between opposite ends of said bolt means for sealingly abutting an inside diameter taper of said locking cup positioned between said inward open end portion and said outward open end portion of said locking cup, for sealing said chamber of said shell to prevent fluid flow through said tube plug.

16. The tube plug according to claim 9, wherein said shell further comprises a plurality of lands surrounding said outer wall of said shell for sealing engagement when installed in a tube for preventing fluid flow through said tube.

17. A method for plugging a tube, including a shell having a threaded bore at least partially therein, bolt means with a threaded portion and at least one recess, and an annular locking cup with a deformed portion and a deformable portion, comprising the steps of:

installing said shell within an open end of a tube;

deforming threads of said locking cup into a deformed portion including at least two segments of outside diameter threads having at least one protuberance positioned between a crest and a root of said outside diameter threads and having at least one portion of a root of said deformed portion offset from a root of the remainder of said deformed portion, said offset of said root being axially aligned with said protuberance for providing resistance to the threading and unthreading of said locking cup into and out of said shell;

threading said locking cup with said deformed portion into said threaded bore of said shell;

disposing said bolt means through a bore of said locking cup and through said threaded bore of said shell; and crimping said deformable portion of said locking cup into said recess of said bolt means.

18. The method according to claim 17, further comprising the steps of:

seating an outside diameter surface of said locking cup against an edge of said shell by providing a torque sufficient to create an interference between said outside diameter surface and said edge for sealing a chamber within said shell to prevent fluid flow through said tube; and seating an outside diameter taper of said bolt means against an inside diameter taper of said locking cup by providing a torque sufficient to create an interference between said outside diameter taper and said inside diameter taper for sealing said chamber within said shell to prevent fluid flow through said tube.

19. The method according to claim 17, further comprising the step of threading said bolt means into a bore of an expander member disposed in said shell for providing an additional fastening feature due to the difference in pitch of threads of said expander member and said bolt means as compared to the pitch of threads of said shell and said locking means for securing said shell, said expander member, said bolt means, and said locking cup together.

* * * * *